United States Patent [19]

Smith

[11] 3,918,745

[45] Nov. 11, 1975

[54] SAFETY CONNECTOR FOR TOWED VEHICLE

[75] Inventor: Raymond L. Smith, Cottage Grove, Oreg.

[73] Assignees: Raymond L. Smith, Cottage Grove; Clifford L. Smith, Lacomb, both of Oreg. ; part interest to each

[22] Filed: Feb. 21, 1975

[21] Appl. No.: 551,621

[52] U.S. Cl. ............... 280/457; 280/480; 403/361; 403/291
[51] Int. Cl.² .......................................... B60D 1/12
[58] Field of Search ............ 280/457, 480; 403/361, 403/291, 381

[56] References Cited
UNITED STATES PATENTS

| 3,212,792 | 10/1965 | Reustle | 280/457 X |
| 3,471,170 | 10/1969 | Rendessy | 280/457 X |

FOREIGN PATENTS OR APPLICATIONS

| 822,474 | 11/1951 | Germany | 280/480 |
| 843,293 | 6/1970 | Canada | 280/457 |

Primary Examiner—Leo Friaglia
Attorney, Agent, or Firm—Kolisch, Hartwell, Dickinson & Stuart

[57] ABSTRACT

A safety connector for connecting a towing and a towed vehicle including an elongate, flexible cable having enlarged ferrules at opposite ends thereof. A holder is secured to one of the vehicles which captures and holds one of the ferrules. Another holder is secured to the other vehicle and is adapted to receive and hold the other ferrule. The second holder includes a mounting plate by which it is secured to the other vehicle, on which mounting plate a socket is secured. The socket has a cylindrical interior chamber for receiving the ferrule at one end of the cable. A seat is provided at one end of the chamber for the ferrule and an entrance aperture is provided at the other end through which the ferrule may be inserted into the chamber. A slot extending longitudinally along one side of the housing permits lateral entry of the cable into the chamber. A keeper plate is mounted for swinging to an open position spaced from the entrance aperture and a position extending across the aperture. In its open position it permits entry of the ferrule into the chamber, and in its closed position inhibits removal from the chamber.

9 Claims, 5 Drawing Figures

U.S. Patent  Nov. 11, 1975  3,918,745
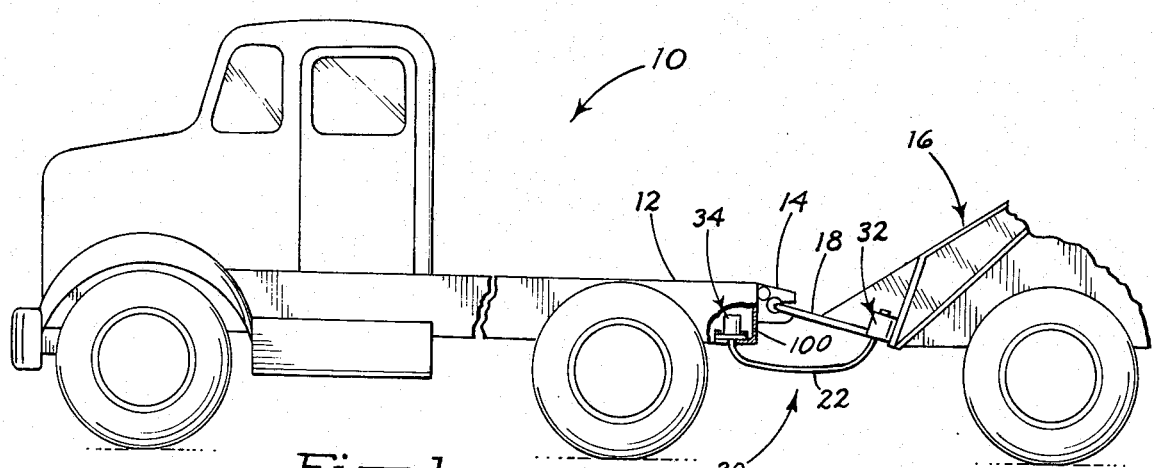
Fig. 1.
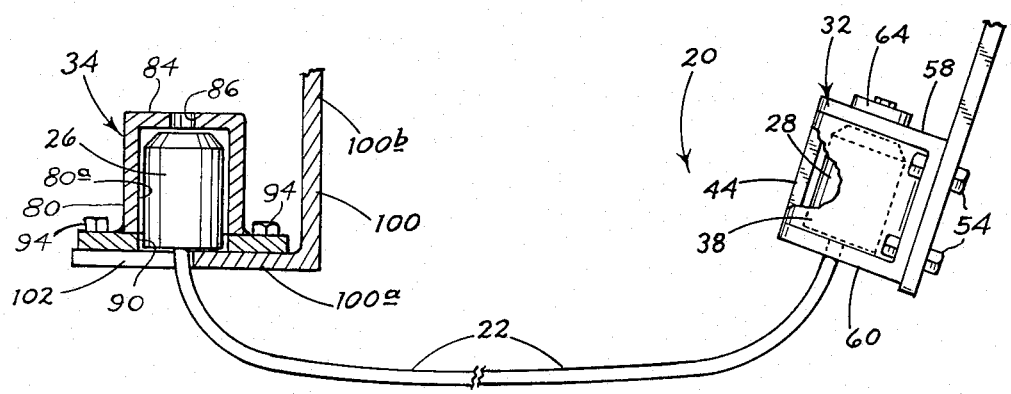
Fig. 2.
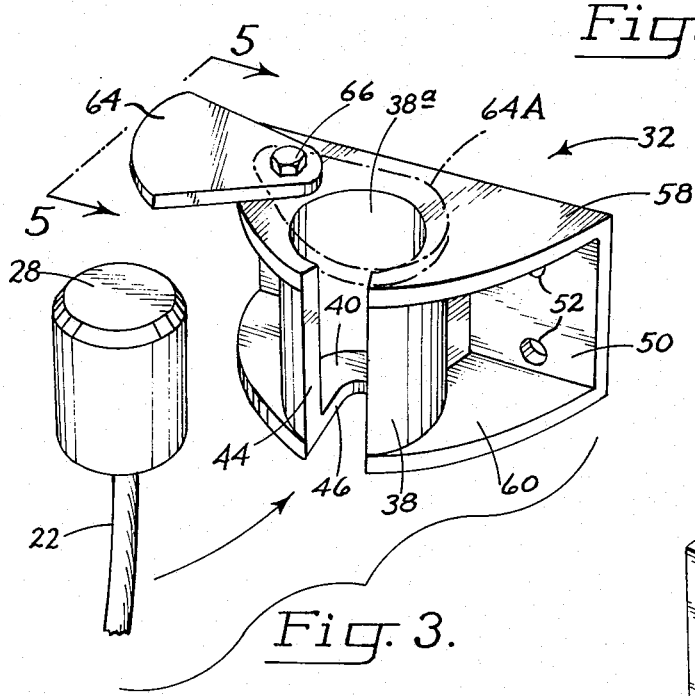
Fig. 3.
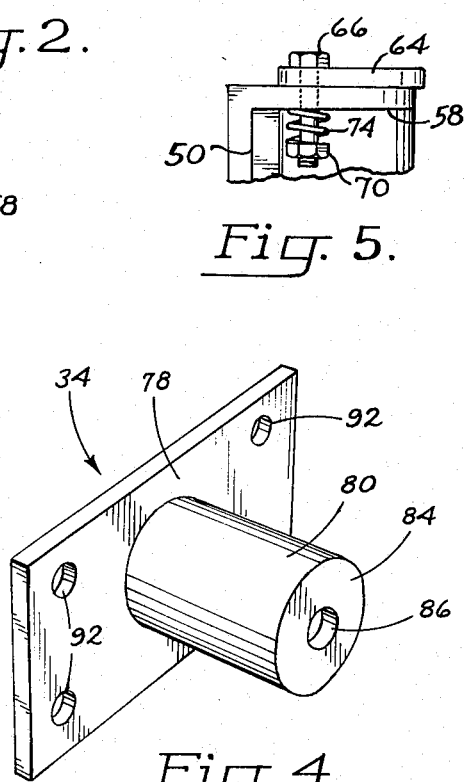
Fig. 5.
Fig. 4.

SAFETY CONNECTOR FOR TOWED VEHICLE

BACKGROUND AND SUMMARY OF THE INVENTION

This invention relates to a connector for interconnecting a towing and a towed vehicle, and more particularly, to such a connector which permits rapid connection and disconnection.

When a towed vehicle, such as a trailer, is hitched to a towing vehicle, such as a tractor for towing, it is necessary to provide a safety connection which prevents the towed vehicle from becoming completely detached from the towing vehicle if the hitch should break. Various safety connectors have been devised in the past, and for the most part, have included the use of chains and means for connecting links of the chain to the towing and towed vehicles, respectively. For a variety of reasons, such chain connectors have not always proved satisfactory.

A general object of the present invention is to provide a novel safety connector for providing auxiliary interconnection between a towing and a towed vehicle, including an elongate flexible member having enlarged end portions with means on the towing and towed vehicles for receiving opposite ends of the flexible member, respectively, and securing them thereto with a degree of swiveling of the flexible member permitted during operation.

Another object of the invention is to provide a novel safety connector wherein an enlarged end of a flexible member may be quickly and simply inserted into a holding device on one of the vehicles for providing an interconnection between the vehicles and may just as simply be removed for disconnecting the same.

More specifically, an object is to provide a novel safety connector providing auxiliary interconnection between a towing and a towed vehicle including an elongate flexible member having enlarged end portions, and a holder secured to one of the vehicles including a socket having an interior chamber adapted to receive an enlarged end portion of the flexible member. The interior chamber has a seat at one end thereof for supporting the enlarged end portion and the opposite end of the chamber is open, defining an entrance aperture into which the enlarged end portion of the member may be slipped. A slot extending longitudinally along one side of the holder receives lateral insertion of remainder portions of the flexible member whereby on full insertion the remainder portions of the member may extend outwardly from the seat portion of the chamber. A keeper is provided which is shiftable between an open position permitting insertion of the enlarged portion of the flexible member in the chamber and a closed position extending over at least a portion of the entrance aperture to inhibit removal of the enlarged end portion.

Another object is to provide a safety connector for towing and towed vehicles which is simply and economically constructed and is simple and efficient in use.

DRAWINGS

These and other objects and advantages will become more fully apparent as the following description is read in conjunction with the drawings, wherein:

FIG. 1 is a side elevation view of a truck tractor and a front end portion of a vehicle towed by the tractor with a safety connector according to the invention interconnecting the two;

FIG. 2 is an enlarged elevation view of the safety connector with portions broken away;

FIG. 3 is an enlarged perspective view of one holder for a cable end in the connector removed from the vehicle with an end of a cable in position for insertion into the holder;

FIG. 4 is an enlarged perspective view of a holder adapted to secure the opposite end of the cable to the other vehicle in the combination; and FIG. 5 is an enlarged view of a portion of the holder of FIG. 3 taken along the line 5—5.

DETAIL DESCRIPTION OF A PREFERRED EMBODIMENT OF THE INVENTION

Referring to the drawings, and first more particularly to FIG. 1, at 10 is indicated generally a truck tractor having an elongate frame 12 to the rear end of which is secured a towing hitch 14. A towed vehicle, the front portion of which is indicated generally at 16 in FIG. 1, has a hitch portion 18 by which the same is secured to hitch 14 on the tractor.

A safety connector constructed according to an embodiment of the invention is illustrated generally at 20 in FIGS. 1 and 2. The connector includes an elongate, flexible cable, or member, 22 having cylindrical ferrules, also referred to as enlarged portions, 26, 28 secured to opposite ends thereof. As is seen, ferrules 26, 28 have a much larger side-to-side dimension than do remainder portions of cable 22 extending therebetween.

A first holder for receiving and holding one of the ferrules is indicated generally at 32 secured to the forward end of towed vehicle 16, and a second holder is indicated generally at 34 for holding the opposite end of the cable and ferrule thereon secured to the rear end of frame 12 of tractor 10.

Describing holder 32 in detail, and referring to FIGS. 2 and 3, the same includes a cylindrical housing 38 having cylindrical interior chamber 38a formed therein. The lower end of chamber 38a is partially closed by an end wall 40 to provide a seat against which a ferrule may rest, as will be explained in greater detail below. Chamber 38a has a diameter slightly greater than the diameter of a ferrule 26, 28, and has a length also slightly greater than the length of a ferrule. The end of chamber 38a opposite seat 40 is open to provide an entrance aperture through which a ferrule may be inserted longitudinally into the chamber.

An elongate slot 44 extends longitudinally of the housing and into chamber 38a and has a side-to-side dimension which is slightly greater than the diameter of cable 22, but is less than the diameter of a ferrule on the end of the cable. A second slot 46 is defined in seat portion 40 of the housing and intersects slot 44. Slot 46 also has a side-to-side dimension which is slightly greater than the diameter of cable 22 but less than the diameter of a ferrule on the end of the cable.

Housing 38 is secured to a mounting plate, or member, 50 which extends at a substantial angle to seat 40 and the entrance aperture at the opposite end of the cylindrical housing. Plate 50 has a plurality of bores 52 extending therethrough through which bolts, such as those indicated generally at 54 in FIG. 2, may extend to secure the holder to a support member on a vehicle.

A pair of webs, or flanges, 58, 60 are secured to opposite ends of housing 38 and extend to and are secured at opposite edges thereof to the mounting plate 50 to provide stabilizing support for housing 38.

A keeper member 64 is pivotally connected to web 58 by a bolt 66 which extends through accommodating bores in the web and keeper member. Keeper member 64 is swingable about bolt 66 between the open position illustrated in solid outline in FIG. 3, spaced from the aperture entrance end of chamber 38 to permit insertion of a ferrule into the chamber, and a closed position illustrated in dot-dashed outline 64A in FIG. 3 extending across and closing off the top of the chamber. In its closed position, it inhibits removal of the ferrule end of the cable from the chamber.

Referring to FIG. 5, bolt 66 extending through keeper member 64 and web 58 has a nut 70 screwed thereon. A compression spring 74 interposed between web 58 and nut 70 urges keeper member 64 into frictional engagement with the top of web 58 to frictionally maintain the keeper plate in a selected position.

Describing holder 34, it includes an elongate rectangular, mounting plate 78. An elongate cylindrical housing 80 is secured, as by welding, to a central portion of the mounting plate with the housing projecting outwardly therefrom. As is seen in FIG. 2, housing 80 has a cylindrical chamber 80a formed therein of sufficient size to receive a ferrule at the end of the cable and permit a degree of swiveling of the ferrule within the chamber. A closure wall 84 having a bore 86 extending through the center thereof closes off the outwardly facing end of housing 80.

As is best seen in FIG. 2, plate 78 has a bore 90 extending therethrough which is substantially the same diameter as chamber 80a and is aligned with chamber 80a. Aligned bore 90 and chamber 80a permit insertion of a ferrule from the rear end of the mounting plate when holder 34 is removed from a vehicle.

A plurality of bores 92 are provided in mounting plate 78 through which bolts, such as those indicated at 94, may extend to secure holder 34 to the tractor.

As is seen in FIGS. 1 and 2, tractor frame 12 includes an elongate channel member 100 secured therein which extends transversely of the rear of the frame. Channel member 100 has a lower, horizontally disposed flange 100a which projects forwardly in the truck from web portion 100b of the channel member. A slot 102 of a width slightly greater than the diameter of cable 22 is cut in flange 100a, with the slot opening through the forward edge margin of the flange.

Describing the initial set up and operation of the connector of the invention, with holder 34 removed from its associated vehicle, ferrule 26 is inserted through bore 90 into chamber 80a. Holder 34 then is moved into position overlying flange 100a, as illustrated in FIG. 2. As it is moved into position overlying flange 100a, cable 22 depending therefrom is slipped into slot 102 in the flange. Holder 34 then is secured to flange 100a by the use of bolts, such as those indicated at 94, with cable 22 extending outwardly through slot 102. With holder 34 thus secured to its associated vehicle, ferrule 26 rests on flange 100a and is captured and held in chamber 80a.

Holder 32 then is secured to the other vehicle as illustrated in FIG. 2 with seat 40 at the bottom of the holder and the entrance aperture to chamber 38a at the top. With keeper 64 swung to its open position, as illustrated in solid outline in FIG. 3, ferrule 28 at the opposite end of cable 22 may be inserted into the chamber by slipping cable 22 laterally through slot 34 and into slot 46 with ferrule 28 spaced above the top of housing 38. Once ferrule 28 is aligned with chamber 38a it may be inserted longitudinally into the chamber to its holding position as illustrated in FIG. 2 with cable 22 extending outwardly from the bottom of the holder through slot 46. Keeper 64 then is swung to its closed position as illustrated in dot-dashed outline at 64A in FIG. 3 to inhibit removal of the ferruled end of the cable.

With the safety connector thus in place, ferrule 26 is effectively captured in holder 34 and ferrule 28 is captured in holder 32. Should hitch 14 release or break, cable 22 extending between the towing and towed vehicle is effective to maintain a secure interconnection between the two vehicles. Keeper 64 prevents ferruled end 28a of the cable from releasing from the holder, yet the ferrules are held sufficiently loosely in their associated chambers in their holders that they may swivel to permit movement of the cable as the towing and towed vehicles change positions relative to one another during operation. This, then, reduces any wear which otherwise may occur with previous safety connectors.

While a preferred embodiment of the invention has been described herein, it should be apparent to those skilled in the art that variations and modifications are possible without departing from the spirit of the invention.

It is claimed and desired to secure by letters patent:
1. A safety connector for connecting a towing vehicle and a towed vehicle comprising
   an elongate flexible member having an enlarged end portion at one end thereof of greater side-to-side dimension than other portions of said member adjacent said end portion,
   a first holder secured to one of said vehicles including a socket having an interior chamber having a side-to-side dimension adapted to receive said enlarged end portion of said member therein, with one end of the chamber defining a seat for said enlarged end portion and the opposite end of the chamber being open to define an entrance aperture spaced from said seat for receiving said enlarged end portion, a restricted longitudinal slot extending through a side of said socket from the entrance aperture to said seat, said slot having a side-to-side dimension greater than said other portions of said member but less than said enlarged end portion for permitting passage of said member into said chamber,
   keeper means shiftable between an open position spaced from said entrance aperture permitting insertion of said enlarged end portion into said chamber and a closed position extending across a portion of said entrance aperture inhibiting removal of said member from the socket, and
   a second holder secured to the other of said vehicles for securing the opposite end of said flexible member to said other vehicle.

2. The connector of claim 1, wherein said opposite end of the flexible member has an enlarged portion thereon which has a greater side-to-side dimension than said other portions of said member, and said second holder comprises a housing in which said enlarged portion of said opposite end of the member is captured with remainder portions of said member extending outwardly therefrom.

3. The connector of claim 1, wherein said first holder is secured to said one vehicle with the entrance aperture thereof above said seat.

4. The connector of claim 1, wherein a second slot is defined in said seat portion of said first holder having a side-to-side dimension greater than said other portions of said flexible member but less than said enlarged portion, said second slot intersecting said first-mentioned slot to permit passage of said other portion of said member through said first-mentioned slot into said second slot whereby said member may project outwardly from the seat end of said first holder.

5. The connector of claim 1, which further comprises means for releasably holding said keeper in a selected one of said positions.

6. The connector of claim 1, wherein said flexible member is a cable, the enlarged portion thereof is a cylindrical ferrule secured to one end of said cable, and said chamber is substantially cylindrical permitting swiveling of said ferrule therein.

7. A safety connector for connecting a towing vehicle and a towed vehicle comprising an elongate flexible member having an enlarged portion at one end thereof of greater side-to-side dimension than remainder portions of said member, a first holder secured to one of said vehicles including a socket having an interior chamber having a side-to-side dimension adapted to receive said enlarged portion of said member therein with one end of the chamber defining a seat for said enlarged portion and the opposite end of the chamber being open to define an entrance aperture spaced from said seat for receiving said enlarged portion, a first longitudinal slot extending through a side of said socket from the entrance aperture to said seat, a second slot defined in said seat end of said holder intersecting said first-mentioned slot, said first and second slots having side-to-side dimensions greater than said remainder portion of said flexible member but less than said enlarged portion permitting passage of said remainder portion of said member through said slots into said chamber with said remainder portion projecting outwardly from the seat end of said first holder, keeper means shiftable between an open position spaced from said entrance aperture permitting insertion of said enlarged portion into said chamber and a closed position extending across a portion of said entrance aperture inhibiting removal of said member from the socket, means for releasably holding said keeper in a selected one of said positions, and a second holder secured to the other of said vehicles for securing the opposite end of said flexible member to said other vehicle.

8. A device for holding an elongate flexible member having an enlarged portion at one end thereof of greater side-to-side dimension than remainder portions of said member, said holder comprising a housing having an interior chamber of side-to-side dimension adapted to receive said enlarged end portion of said member with one end of the chamber defining a seat for said enlarged portion and the opposite end of the chamber being open to define an entrance aperture spaced from said seat of sufficient side-to-side dimension for receiving said enlarged portion therethrough, a longitudinal slot extending through a side of said socket from the entrance aperture to said seat, said slot having a side-to-side dimension greater than said remainder portions of said flexible member but less than said enlarged portion for receiving passage of said member into said chamber, keeper means shiftable between an open position spaced from said entrance aperture permitting insertion of said enlarged portion into said chamber and a closed position extending across a portion of said entrance aperture to inhibit removal of said member from the socket, an elongate mounting member secured to one side of said housing and extending at a substantial angle relative to said entrance aperture providing means for securing said housing to other structure, and a support web extending between and secured at opposite edges thereof to said housing and said mounting member to support said housing on said mounting member.

9. The holder of claim 8, wherein said housing is substantially cylindrical and which further comprises a second web, with said first-mentioned web secured to and supporting one end of said cylinder and said second web being secured to and interconnecting the opposite end of said cylinder to said mounting plate.

* * * * *